United States Patent
Boenapalli et al.

(10) Patent No.: US 12,326,828 B2
(45) Date of Patent: Jun. 10, 2025

(54) SYSTEMS AND METHODS FOR PERFORMING LINK SPEED SWITCHING IN A PERIPHERAL COMPONENT INTERCONNECT EXPRESS (PCIe) SYSTEM

(71) Applicant: QUALCOMM INCORPORATED, San Diego, CA (US)

(72) Inventors: Madhu Yashwanth Boenapalli, Hyderabad (IN); Kaustub Naidu Paila Ram, Hyderabad (IN); Sravani Devineni, Hyderabad (IN); Sai Praneeth Sreeram, Anantapur (IN); Vinod Kumar Kuruma, Jogulamba Gadwal (IN); Rajendra Varma Pusapati, Hyderabad (IN); Surendra Paravada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 18/314,676

(22) Filed: May 9, 2023

(65) Prior Publication Data
US 2024/0378166 A1    Nov. 14, 2024

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC .............. G06F 13/4221; G06F 2213/0026
See application file for complete search history.

(56) References Cited

U.S. PATENT DOCUMENTS

| | | | |
|---|---|---|---|
| 7,496,109 B1* | 2/2009 | Gupta | H04L 47/22 370/428 |
| 10,732,697 B2 | 8/2020 | Srinivas et al. | |
| 11,226,919 B1* | 1/2022 | Austin | G06F 9/4401 |
| 2003/0118024 A1* | 6/2003 | Lee | H04L 45/24 370/238 |
| 2013/0051483 A1* | 2/2013 | Wyatt | H04L 25/03885 375/259 |
| 2013/0067127 A1* | 3/2013 | Hopgood | G06F 13/00 710/104 |
| 2017/0277643 A1* | 9/2017 | Zhou | G06F 1/3206 |

(Continued)

OTHER PUBLICATIONS

International Search Report and Written Opinion—PCT/US2024/019446—ISA/EPO—Jun. 18, 2024.

*Primary Examiner* — Faisal M Zaman
(74) *Attorney, Agent, or Firm* — Smith Tempel Blaha LLC/Qualcomm (57) ABSTRACT

A Peripheral Component Interconnect Express (PCIe) system is configured to determine when the frequency of link speed switching needed to service incoming and upcoming client requests is too high. The system is also configured to determine a modest link speed to be used to service incoming and upcoming client requests in cases where the link speed switching that will be needed is too high and causes the incoming and upcoming client requests to be serviced at the modest link speed instead of at the link speeds associated with the predefined BWs of the clients. By doing this when the frequency of link speed switching needed is too high, the PCIe system achieves better throughput while also reducing power consumption.

27 Claims, 8 Drawing Sheets

(56) References Cited

U.S. PATENT DOCUMENTS

| | | | |
|---|---|---|---|
| 2018/0191993 A1* | 7/2018 | Gera | H04N 23/65 |
| 2018/0267595 A1* | 9/2018 | Nampoothiri | G06F 1/3225 |
| 2019/0121417 A1 | 4/2019 | Schneider et al. | |
| 2020/0008144 A1 | 1/2020 | Klacar et al. | |
| 2020/0233829 A1 | 7/2020 | Valiparambil Divakar et al. | |
| 2020/0371579 A1* | 11/2020 | Selvam | G06F 13/4282 |
| 2023/0086121 A1* | 3/2023 | Mahasenan | H04W 52/367 |
| | | | 370/318 |

* cited by examiner

| Rsvd Bit 11 | Rsvd Bit 12 | Count |
|---|---|---|
| 0 | 0 | <5 |
| 0 | 1 | 5 <count <10 |
| 1 | 0 | 10<count<20 |
| 1 | 1 | >20 |

SYSTEMS AND METHODS FOR PERFORMING LINK SPEED SWITCHING IN A PERIPHERAL COMPONENT INTERCONNECT EXPRESS (PCIe) SYSTEM

DESCRIPTION OF THE RELATED ART

A computing device may include multiple processor-based subsystems. Such a computing device may be, for example, a portable computing device ("PCD"), such as a laptop or palmtop computer, a cellular telephone or smartphone, a portable digital assistant, a portable game console, etc. Still other types of PCDs may be included in automotive and Internet-of-Things ("IoT") applications.

Such processor-based subsystems may be included within the same integrated circuit chip or in different chips. A "system-on-a-chip", or "SoC", is an example of one such chip that integrates numerous subsystems to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other subsystems, such as a transceiver or "modem" subsystem that provides wireless connectivity, a memory subsystem, etc.

Many of these subsystems communicate with one another using a standardized packet-based interface technology known as Peripheral Component Interface Express (PCIe). The PCIe 6.0 standard supports 128 Giga transfers per second (GT/s) over a PCIe bus. Components communicate over lanes of the PCIe bus at various link speeds. The component that initiates a packet transfer is commonly referred to as the root complex (RC) and the component receiving the packet transfer is commonly referred to as the end point. When a packet transfer is to be made, the RC sends a request. Each RC has a predefined bandwidth (BW) that it uses to make packet transfers and that BW determines the link speed that the RC attempts to use for packet transfers. Because the predefined BWs for different RCs can be different, the link speeds can be different for different RCs.

The predefined BWs are included in the requests that the RCs issue prior to making the packet transfers to the end points. Based on the BW contained in the request, the PCIe bus identifies the link speed associated with the BW and makes the transfer at the identified link speed. Because different RCs have different BWs, the PCIe bus must switch between the different link speeds in order to service requests. This link speed switching is sometimes referred to as Gen switching.

Each different PCIe link speed has a different power consumption and a different latency. Higher link speeds consume more power and have lower latency. In SoCs used in automotives and cell site modem (CSM) units placed at remote locations with surroundings of extreme temperatures, the PCIe system often performs frequent link speed switching to mitigate data errors that can be caused by excess engine heat and severe environment conditions. These extreme temperatures along with high PCIe link speeds may result in a large number of data reliability issues (e.g., increased bit error rates (BERs) on lanes that are captured in Lane Error Registers), which often leads to a requirement to perform link speed switching to mitigate these issues.

A need exists for a way to reduce power consumption and latency when performing link speed switching in PCIe systems.

SUMMARY OF THE DISCLOSURE

Systems, methods, and other examples are disclosed for performing link speed switching in a PCIe system.

An exemplary embodiment of the method comprises:
with a pattern checker circuit of a PCIe host processor of the PCIe system, evaluating information over a first predefined period of time relating to a current batch of client requests to identify a modest link speed;
with a link speed decision circuit of the PCIe system, deciding whether the client requests are to be served at the modest link speed or at respective link speeds associated with the respective client requests and outputting a link speed decision; and
in a switch of the PCIe system, performing link speed switching based on the link speed decision.

An exemplary embodiment of the PCIe system comprises a pattern checker circuit, a link speed decision circuit and a switch. The pattern checker circuit is configured to evaluate information over a first predefined period of time relating to a current batch of client requests to identify a modest link speed. The link speed decision circuit is configured to decide whether the client requests are to be served at the modest link speed or at respective link speeds associated with the respective client requests and to output a link speed decision. The switch is configured to perform link speed switching based on the link speed decision.

An exemplary embodiment of a computer program for execution by a processor of a PCIe system for performing link speed switching in the PCIe system comprises computer instructions comprising first, second and third sets of computer instructions. The first set of computer instructions is for evaluating information over a first predefined period of time relating to a current batch of client requests to identify a modest link speed. The second set of computer instructions is for deciding whether the client requests are to be served at the modest link speed or at respective link speeds associated with the respective client requests and for outputting a link speed decision. The third set of computer instructions is for causing a switch of the PCIe system to perform link speed switching based on the link speed decision.

Another exemplary embodiment of the PCIe system comprises means for evaluating information over a first predefined period of time relating to a current batch of client requests to identify a modest link speed, means for deciding whether the client requests are to be served at the modest link speed or at respective link speeds associated with the respective client requests and for outputting a link speed decision, and means for causing a switch of the PCIe system to perform link speed switching based on the link speed decision.

These and other features and advantages will become apparent from the following description, drawings and claims.

BRIEF DESCRIPTION OF THE DRAWINGS

In the Figures, like reference numerals refer to like parts throughout the various views unless otherwise indicated. For reference numerals with letter character designations such as "101a" or "101b", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

Frequent link speed switching can lead to increased power consumption and increased state entry/exit latencies associated with switching between different link speeds. In a scenario where multiple client requests are coming into the RC (e.g., the host processor) intermittently from different drivers (i.e., from clients of the host processor), the PCIe bus almost continuously performs link speed switching in order to honor those requests. In such scenarios, frequently switching from, for example, a higher link speed, to a lower link speed and then back to higher link speed results in the system incurring penalties in two ways, namely, increased power consumption and increased latency. The act of switching link speeds consumes power. The increase in latency is due to link retraining and reconfiguring of the host processor and of the drivers to allow them to operate at the new link speed.

Figure 1:
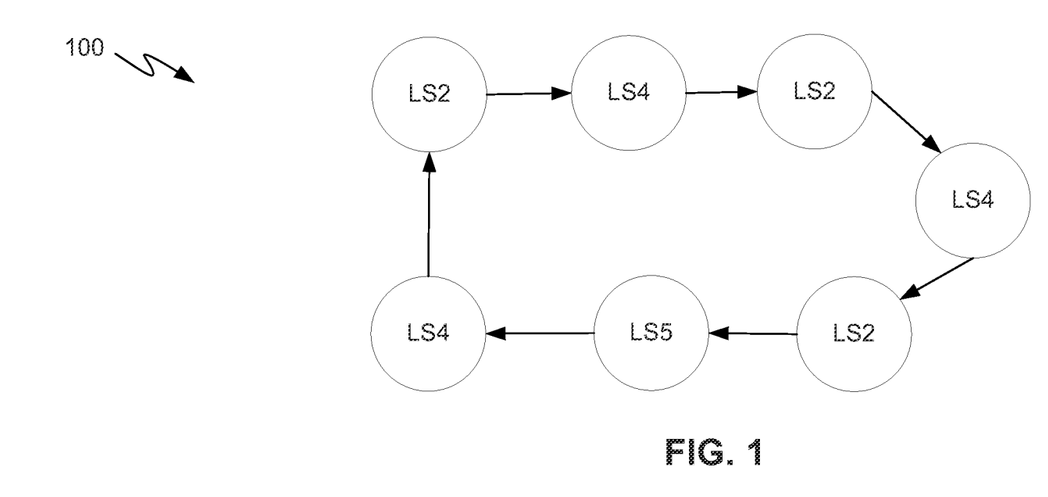
FIG. 1 illustrates a state diagram showing an example of the current manner in which link speed (LS) switching is performed in PCIe systems where intermittent client requests with mixed loads are coming into the host processor.

FIG. 1 illustrates a state diagram showing an example of the manner in which link speed (LS) switching is currently performed in PCIe systems where intermittent client requests with mixed loads are coming into the host processor. In this example, LS switching is performed between different LSs 2, 4 and 5, which correspond to states 2, 4 and 5, respectively. In this example, LS switching always takes place as per the BW requested by the driver that is communicating with RC to initiate a packet transfer. It can be seen from FIG. 1 that such a sequence of client requests causes continuous link switches, i.e., from LS2 to LS4 to LS2 to LS4 to LS2 to LS5 to LS4 and back to LS2.

Figure 2:
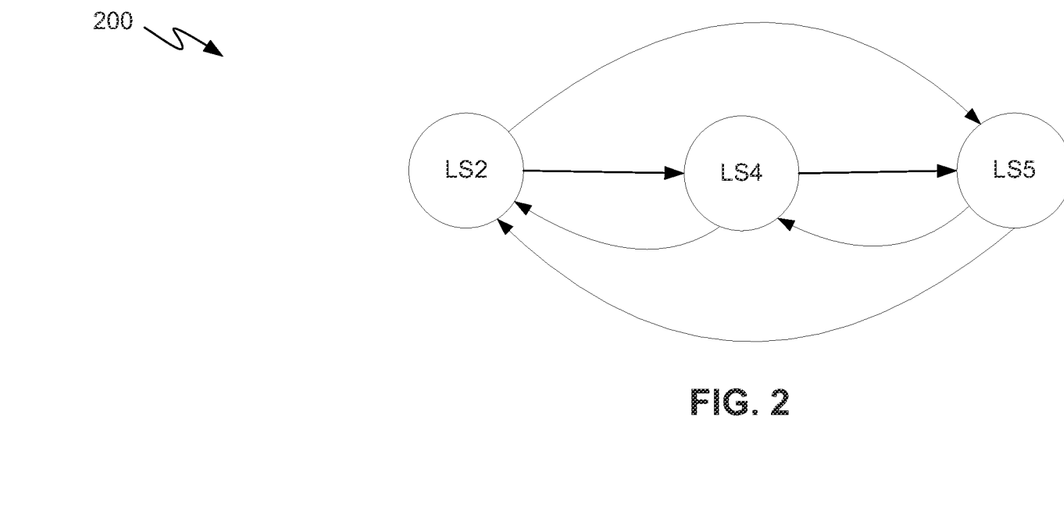
FIG. 2 illustrates a quantitative analysis diagram of the state diagram shown in FIG. 1.

FIG. 2 illustrates a quantitative analysis diagram of the state diagram shown in FIG. 1. The total power consumption, $P_1$, for this sequence of LS switching can be expressed as:

$$(P_1) = P_{2-4} + P_{4-5} + P_{2-5} + P_{4-2} + P_{5-4} + P_{5-2} \quad \text{(Eq. 1)}$$

where $P_{2-4}$ is the power consumption associated with switching between states LS2 and LS4, $P_{4-5}$ is the power consumption associated with switching between states LS4 and LS5, $P_{2-5}$ is the power consumption associated with switching between states LS2 and LS5, $P_{4-2}$ is the power consumption associated with switching between states LS4 and LS2, $P_{5-4}$ is the power consumption associated with switching between states LS5 and LS4, and $P_{5-2}$ is the power consumption associated with switching between states LS5 and LS2.

The total time latency, $T_1$, can be expressed as:

$$(T_1) = T_{2-4} + T_{4-5} + T_{2-5} + T_{4-2} + T_{5-4} + T_{5-2} \quad \text{(Eq. 2)}$$

where $T_{2-4}$ is the latency associated with switching between states LS2 and LS4, $T_{4-5}$ is the latency associated with switching between states LS4 and LS5, $T_{2-5}$ is the latency associated with switching between states LS2 and LS5, $T_{4-2}$ is the latency associated with switching between states LS4 and LS2, $T_{5-4}$ is the latency associated with switching between states LS5 and LS4, and $T_{5-2}$ is the latency associated with switching between states LS5 and LS2.

In accordance with inventive principles and concepts of the present disclosure, it has been observed that PCIe systems used in SoCs of automotives may see a large number of reliability issues due to frequent LS switching, which gives rise to the need to operate at a "modest" link speed, as that term is defined herein, and to switch between link speeds less frequently. Also, increased frequency of operation can lead to electromagnetic interference (EMI) and other channel losses, which can also be addressed by operating at a modest link speed and switching between link speeds less frequently. Currently, there is no standard that defines when the frequency of LS switching is too high such that some action needs to be taken to reduce LS switching in order to avoid an increase in power consumption and in entry/exit latencies.

In accordance with inventive principles and concepts of the present disclosure, PCIe systems and methods are provided herein that (1) determine when the frequency of LS switching that will be needed to service incoming and upcoming client requests is too high, (2) determine a modest LS to be used to service incoming and upcoming client requests, and (3) when the frequency is too high, services incoming and upcoming client requests at the modest LS instead of at the LS associated with the predefined BWs of the drivers, also referred to herein as clients. This allows the PCIe system to achieve better throughput through reduced latencies while also reducing power consumption. Examples of these systems and methods are discussed below with reference to the figures.

Figure 3:
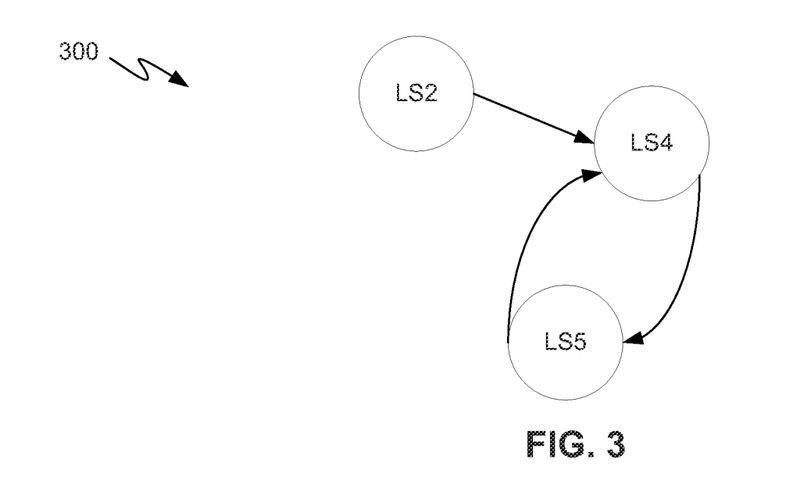
FIG. 3 illustrates a state diagram showing an example of PCIe LS switching in accordance with an exemplary embodiment of the present disclosure.

FIG. 3 illustrates a state diagram showing an example of PCIe LS switching in accordance with an exemplary embodiment of the present disclosure. In this exemplary scenario, intermittent client requests with mixed loads are coming into the host processor and LS switching is being performed between LSs 2, 4 and 5 corresponding to states 2, 4 and 5, respectively. In this exemplary scenario, LS switching is not taking place as per the BW of the driver making the client requests, but is based on an evaluation of data link layer (DLL) information and transaction layer (TL) information related to incoming client requests (i.e., those that are currently queued up in the DLL and upcoming client requests), and upcoming client requests (i.e., those that are in the TL and that will be serviced after those that are queued in the DLL). In this example, the host processor, also referred to herein interchangeably as the RC, has evaluated this information and determined that LS 4 is the LS that is being requested most often and is therefore the "modest LS," as that term is used herein. Thus, the term "modest" LS, as that term is used herein, denotes the LS that is most often requested in the incoming and upcoming requests combined.

The host processor has also determined that the number of LS switches that will be needed to service the incoming and upcoming requests combined exceeds a predefined, configurable threshold (TH) value, and therefore only operates in the modest LS, LS 4, but only for a predefined, configurable period of time. During that period of time, the host processor prevents LS switching from occurring. This LS switching process obtains a better tradeoff between power saving and latency.

In this example, the host processor also checks the frequency of LS 5 requests originating at the RC that are currently being served at LS 4, and after the predefined period of time has passed, switches to LS 5. The system then operates at LS 5 for a predefined period of time. After that predefined period of time has passed, the process reiterates, i.e., the modest LS is again determined to be LS 4 in this example and a determination is made that the frequency of LS switching has exceed the predefined TH value, causing it to switch from LS 5 back to LS 4 and to operate at LS4 for the predefined period of time before switching back to LS5 and operating at LS5 for a predefined period of time.

Figure 4:
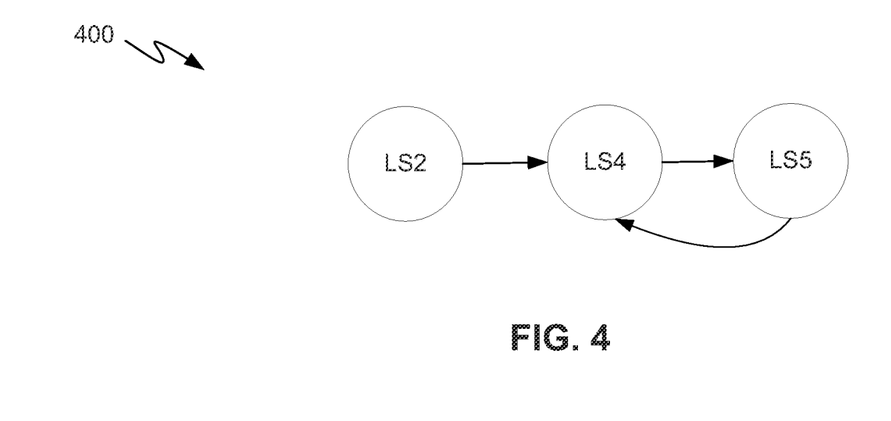
FIG. 4 illustrates a quantitative analysis diagram associated with the state diagram shown in FIG. 3.

FIG. 4 illustrates a quantitative analysis diagram associated with the state diagram shown in FIG. 3. The total power consumption for this sequence of switching. $P_2$, can be expressed as:

$$(P_2) = P_{2-4} + P_{4-5} + P_{5-4} \qquad \text{(Eq. 3)}$$

The total time latency, $T_2$, for this sequence can be expressed as:

$$(T_2) = T_{2-4} + T_{4-5} + T_{5-4} \qquad \text{(Eq. 4)}$$

It can be seen from a comparison of Eq. 1 with Eq. 3 and Eq. 2 with Eq. 4 that $P_2$ and $T_2$ are always less than $P_1$ and $T_1$, respectively, demonstrating that the PCIe method of the present disclosure achieves reduced latency and reduced power consumption.

Exemplary embodiment of the manner in which system can be configured to perform this process are discussed below with reference to the remaining figures. In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The words "illustrative" or "representative" may be used herein synonymously with "exemplary." Any aspect described herein as "exemplary" is not necessarily to be construed as preferred or advantageous over other aspects. However, it will be apparent to one having ordinary skill in the art and having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory device", as that term is used herein, is intended to denote a non-transitory computer-readable storage medium that is capable of storing computer instructions, or computer code, for execution by one or more processors. References herein to a "memory device" should be interpreted as including one or more memory devices.

A "processor", as that term is used herein encompasses an electronic component that is able to execute a computer program or executable computer instructions. References herein to a computer comprising "a processor" should be interpreted as one or more processors. The processor may for instance be a multi-core processor comprising multiple processing cores, each of which may comprise multiple processing stages of a processing pipeline. A processor may also refer to a collection of processors within a single system or distributed amongst multiple systems.

A computing device may include multiple subsystems, cores or other components. Such a computing device may be, for example, a PCD, such as a laptop or palmtop computer, a cellular telephone or smartphone, a portable digital assistant, a portable game console, an automotive safety system, etc.

Figure 5:
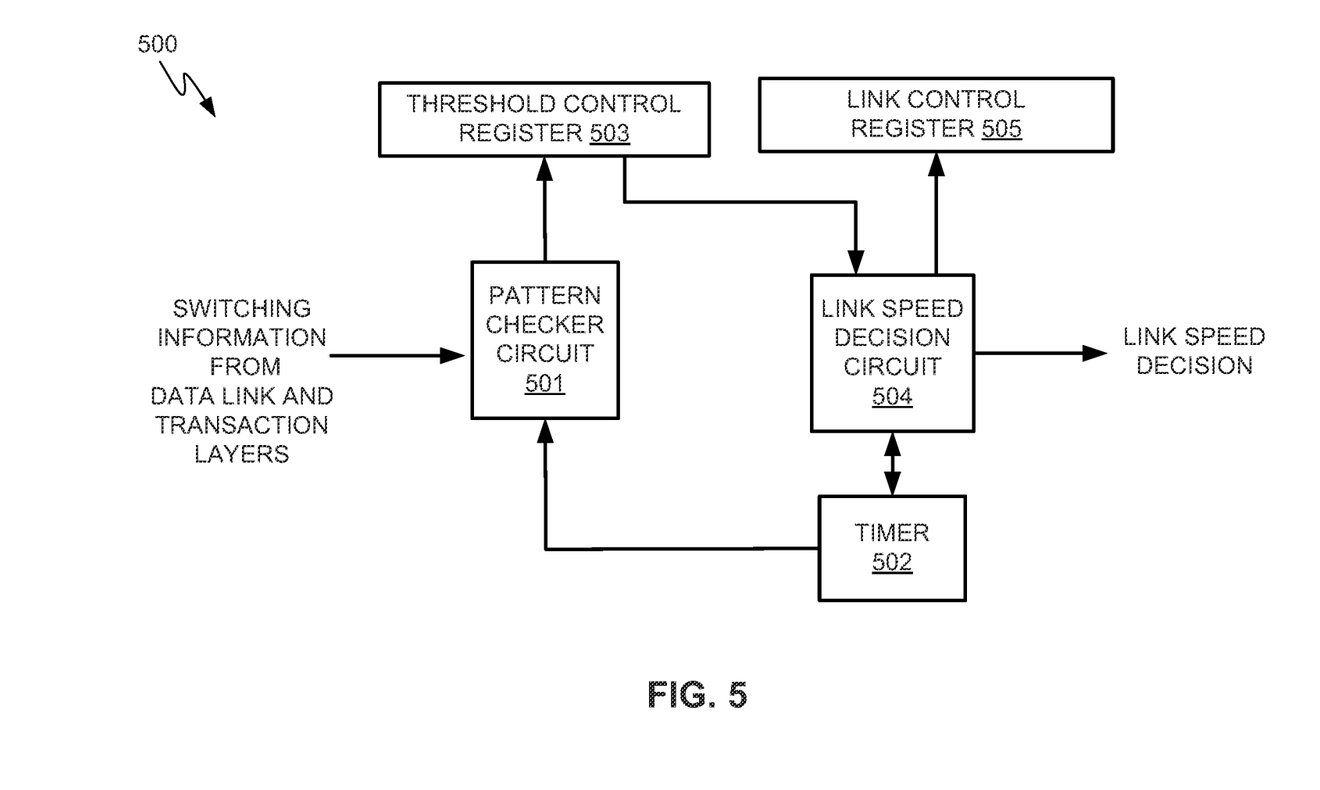
FIG. 5 illustrates a block diagram of the PCIe system in accordance with an exemplary embodiment that may be incorporated into, for example, an SoC of a PCD.

FIG. 5 illustrates a block diagram of the PCIe system 500 in accordance with an exemplary embodiment that may be incorporated into, for example, an SoC of a PCD. It should be noted that the PCIe system 500 may be beneficially used in systems other than SoCs or PCDs. The PCIe system 500 may be implemented in logic of the aforementioned host processor operating as an RC or of a central processing unit (CPU) controlling the PCIe bus. For exemplary purposes, it will be assumed that the system 500 is implemented in a host processor of an SoC that is receiving requests from other devices of the SoC via a PCIe bus of the SoC. These other devices are referred to hereinafter as clients or drivers.

A pattern checker circuit 501 of the system 500 receives the aforementioned information from the DLL and from the TL of the SoC regarding client requests that are in the DLL about to be serviced (i.e., incoming client requests) and client requests that are in the TL that will be serviced subsequent to the incoming client requests being serviced (i.e., upcoming client requests). The pattern checker circuit 501 evaluates this information over a predefined period of time to determine the modest LS, which is the LS corresponding to the BW most often occurring in the incoming and upcoming requests combined over this period of time.

The pattern checker circuit 501 includes a counter that increments each time the pattern checker detects an LS switch in the incoming and upcoming client requests during this predefined period of time and compares the count to one or more predefined, configurable TH values. In accordance with an exemplary embodiment, the pattern checker circuit 501 uses three TH values, namely, 5, 10 and 20, and updates bits of a threshold control register 503 of the system 500 with results of comparing the count with these three TH values.

Figure 6:
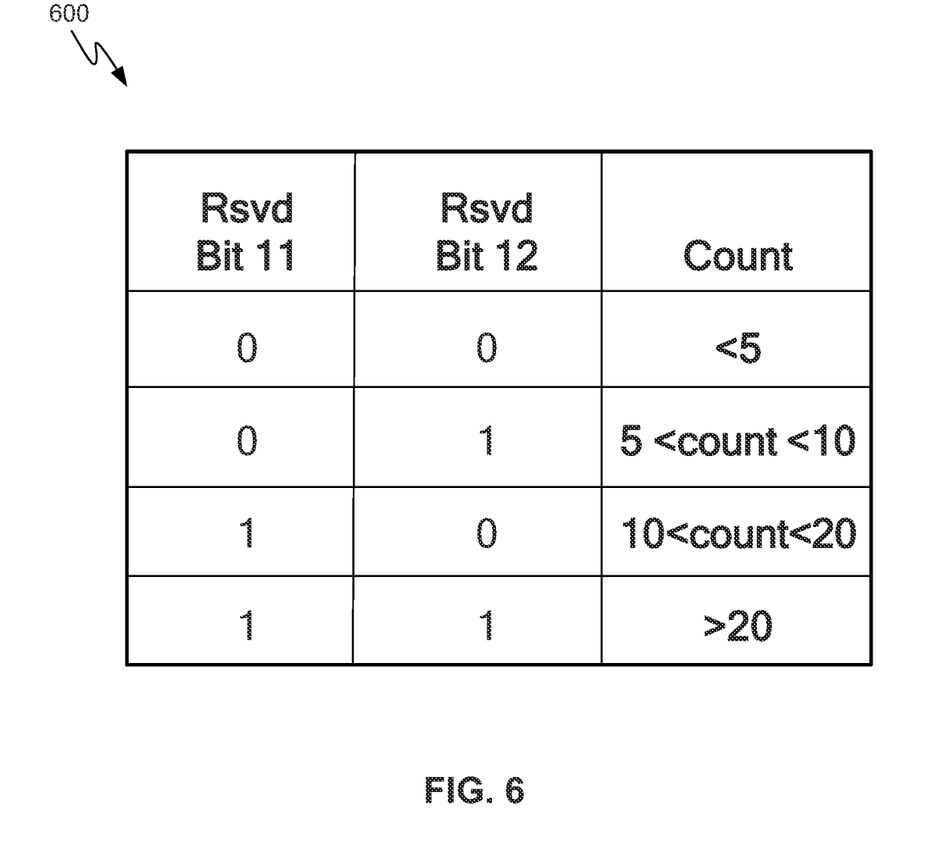
FIG. 6 illustrates a table that shows the values of two bits contained in the threshold control register shown in FIG. 5 and the counts that are represented by the bits.

FIG. 6 is a table that shows the values of two bits contained in the threshold control register 503 and the counts associated with different binary numbers represented by the bits. In accordance with an exemplary embodiment, these bits are reserved bits 11 and 12 of a device control register of the host processor, but they could be bits stored at any location. In accordance with an exemplary embodiment, when the count is less than 5, bits 11 and 12 are set to 0, 0; when the count is greater than 5 and less than 10, bits 11 and 12 are set to 0, 1, respectively; when the count is greater than 10 and less than 20, bits 11 and 12 are set to 1, 0, respectively; and when the count is greater than 20, bits 11 and 12 are set to 1, 1, respectively. It should be noted that any number of TH values and any number of bits may be used for this purpose, as these can be selected by the user based on user preferences.

At or after the end of the predefined period of time, an LS decision circuit 504 of the system 500 reads the current values of bits 11 and 12, resets bits 11 and 12 to 0,0, respectively, after reading them, and makes a decision on whether or not to use the LSs associated with the BWs of the requests or the modest LS identified by the pattern checker circuit 101. The LS decision circuit 504 controls a timer 502 to set and reset any predefined time periods used by the LS decision circuit 504 and by the pattern checker 501. After reading these bits and making the decision, the LS decision circuit 504 outputs the LS decision.

If the LS decision circuit 504 decides that bits 11 and 12 indicate that the count is sufficiently high that frequent switching warrants the use of the modest LS identified by the pattern checker 501, the LS decision output by the LS decision circuit 504 will indicate that the modest LS is to be used for all requests from now until the end of a predefined, configurable period of time. The LS decision circuit 504 controls the timer 502 that it sets and resets to control the predefined periods of time used by the pattern checker circuit 501 and by the LS decision circuit 504.

If the LS decision circuit 504 makes the decision that the modest LS is to be used for all requests from now until the end of the predefined time period, it deasserts a retraining link bit contained in a link control register 505, e.g., sets it to a logic 0. The retraining link bit is queried by the clients each time a client request would require an LS switch, and therefore deasserting it causes the deasserted logic value to be returned to the client. This informs the client that operating at the modest LS will not require an LS switch, which prevents the client from attempting to initiate a link retraining session. After some predefined, configurable period of time, the LS decision circuit 504 resets the retraining link bit to its asserted logic value to allow the LSs associated with the BWs of client request to be used instead of the modest LS.

Figure 7:
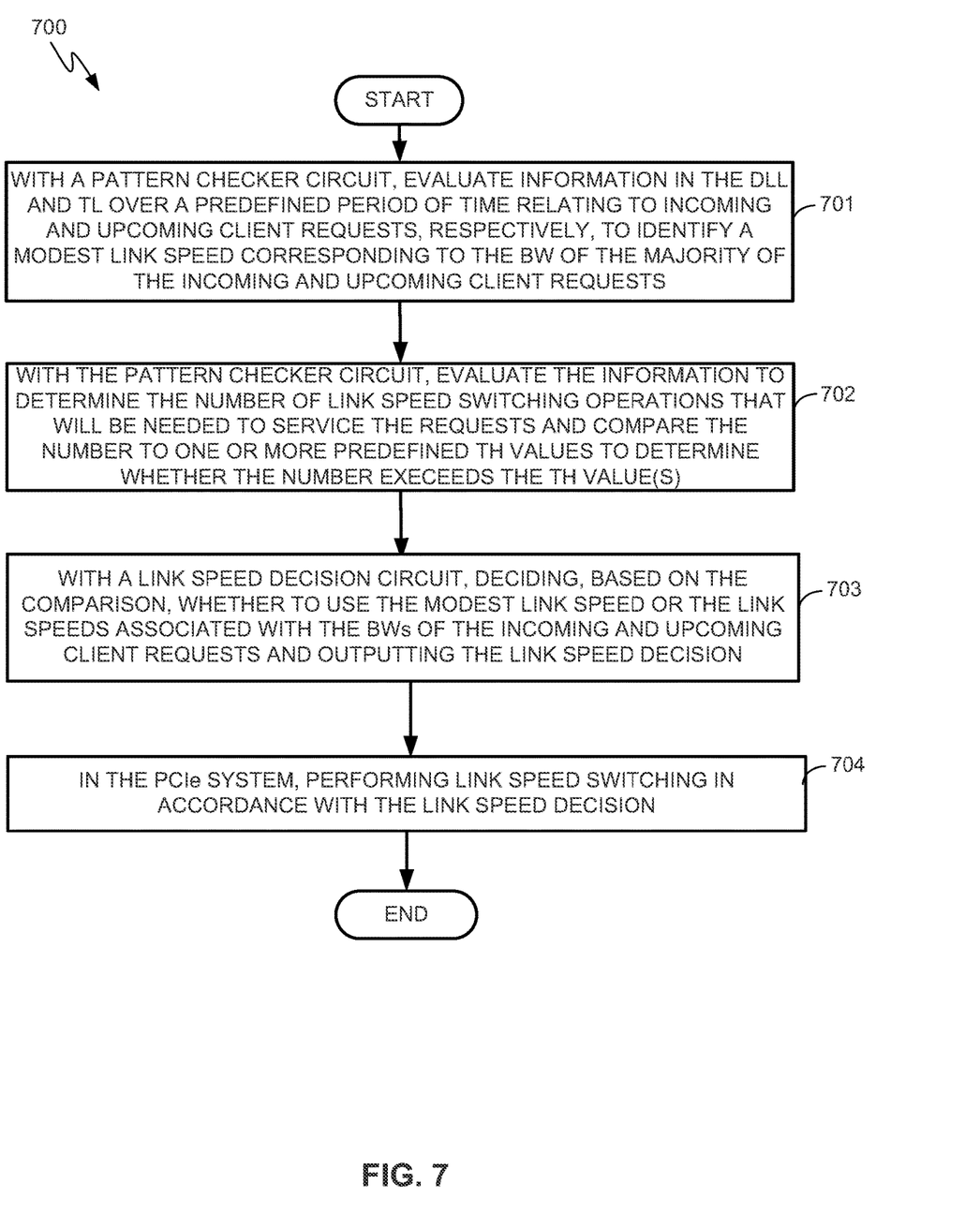
FIG. 7 illustrates a flow diagram of the PCIe method in accordance with an exemplary embodiment.

FIG. 7 is a flow diagram of the PCIe method in accordance with an exemplary embodiment. Block 701 represent the process performed by the pattern checker circuit 501 of evaluating information carried in the DLL and TL over a predefined period of time relating to incoming and upcoming client requests, respectively, directed at the host processor to identify the modest LS corresponding to the BW associated with a majority of the incoming and upcoming client requests.

Block 702 represents the process performed by the pattern checker circuit of evaluating that information to determine a number of LS switching operations that will be needed to service the incoming and upcoming client requests and comparing that number to one or more predefined TH values to determine whether the number exceeds the predefined TH value(s).

Block 703 represents the process performed by the LS decision circuit 504 of deciding, based on results of the comparison, whether the incoming and upcoming client requests are to be served at the identified modest LS or at the LSs corresponding to the BWs associated with each of the incoming and upcoming client requests and outputting the LS decision. Block 704 represents the process of the PCIe system performing LS switching based on the LS decision.

Figure 8:
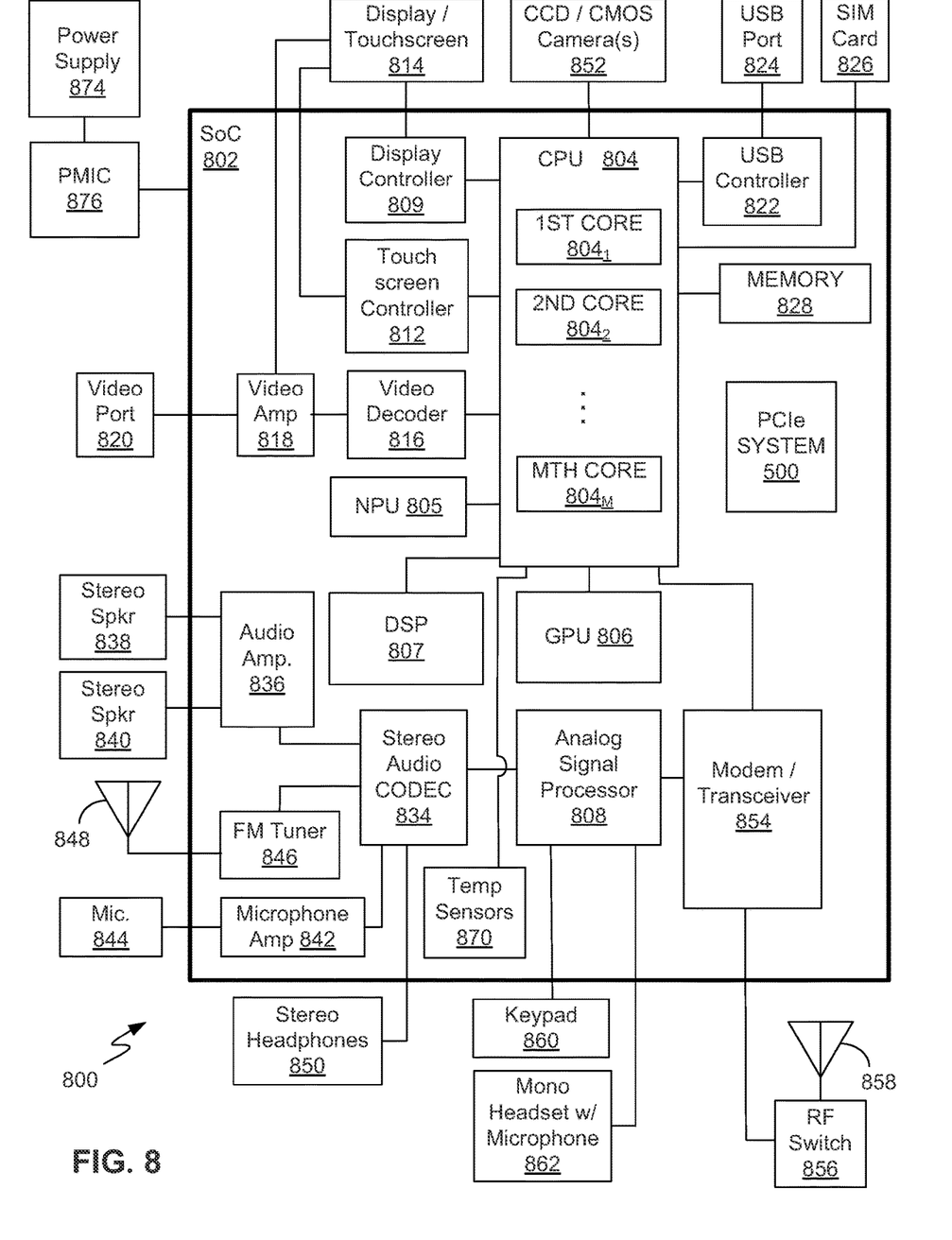
FIG. 8 illustrates an example of a PCD comprising an SoC in which the PCIe system shown in FIG. 5 can be incorporated.

FIG. 8 illustrates an example of a PCD 800, such as a mobile phone, a smartphone, a portable game console such as an Extended Reality (XR) device, a Virtual Reality (VR) device, an Augmented Reality (AR) device, or a Mixed Reality (MR) device, etc., in which exemplary embodiments of systems, methods, computer-readable media, and other examples of providing LS switching according to the inventive principles and concepts may be implemented. The PCD 800 comprises an SoC 802, which comprises the PCIe system 500 shown in FIG. 5. For purposes of clarity, some interconnects, signals, etc., are not shown in FIG. 8. For example, the connections of the components of the SoC 802 to the PCIe bus (not shown) of the PCIe system 500 are not shown in FIG. 8.

The SoC 802 may include a CPU 804, an NPU 805, a GPU 806, a DSP 807, an analog signal processor 808, a modem/modem subsystem 854, or other processors. The CPU 804 may include one or more CPU cores, such as a first CPU core $804_1$, a second CPU core $804_2$, etc., through an $M^{th}$ CPU core $804_M$.

A display controller 809 and a touch-screen controller 812 may be coupled to the CPU 804. A touchscreen display 814 external to the SoC 802 may be coupled to the display controller 810 and the touch-screen controller 812. The PCD 800 may further include a video decoder 816 coupled to the CPU 804. A video amplifier 818 may be coupled to the video decoder 816 and the touchscreen display 814. A video port 820 may be coupled to the video amplifier 818. A universal serial bus ("USB") controller 822 may also be coupled to CPU 804, and a USB port 824 may be coupled to the USB controller 822. A subscriber identity module ("SIM") card 826 may also be coupled to the CPU 804.

One or more memories 828 may be coupled to the CPU 804. The one or more memories 828 may include both volatile and non-volatile memories. Examples of volatile memories include static random access memory ("SRAM") and dynamic random access memory ("DRAM"). Such memories may be external to the SoC 802 or internal to the SoC 802. The one or more memories 828 may include local cache memory or a system-level cache memory.

A stereo audio CODEC 834 may be coupled to the analog signal processor 808. Further, an audio amplifier 836 may be coupled to the stereo audio CODEC 834. First and second stereo speakers 838 and 840, respectively, may be coupled to the audio amplifier 836. In addition, a microphone amplifier 842 may be coupled to the stereo audio CODEC 834, and a microphone 844 may be coupled to the microphone amplifier 842. A frequency modulation ("FM") radio tuner 846 may be coupled to the stereo audio CODEC 834. An FM antenna 848 may be coupled to the FM radio tuner 846. Further, stereo headphones 850 may be coupled to the stereo audio CODEC 834. Other devices that may be coupled to the CPU 804 include one or more digital (e.g., CCD or CMOS) cameras 852.

A modem or RF transceiver 854 may be coupled to the analog signal processor 808 and the CPU 804. An RF switch 856 may be coupled to the RF transceiver 854 and an RF antenna 858. In addition, a keypad 860 and a mono headset with a microphone 862 may be coupled to the analog signal processor 808. The SoC 802 may have one or more internal or on-chip thermal sensors 870. A power supply 874 and a PMIC 876 may supply power to the SoC 802.

Firmware or software may be stored in any of the above-described memories, or may be stored in a local memory directly accessible by the processor hardware on which the software or firmware executes. Execution of such firmware or software by the PCIs system 500 may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Figure 9:
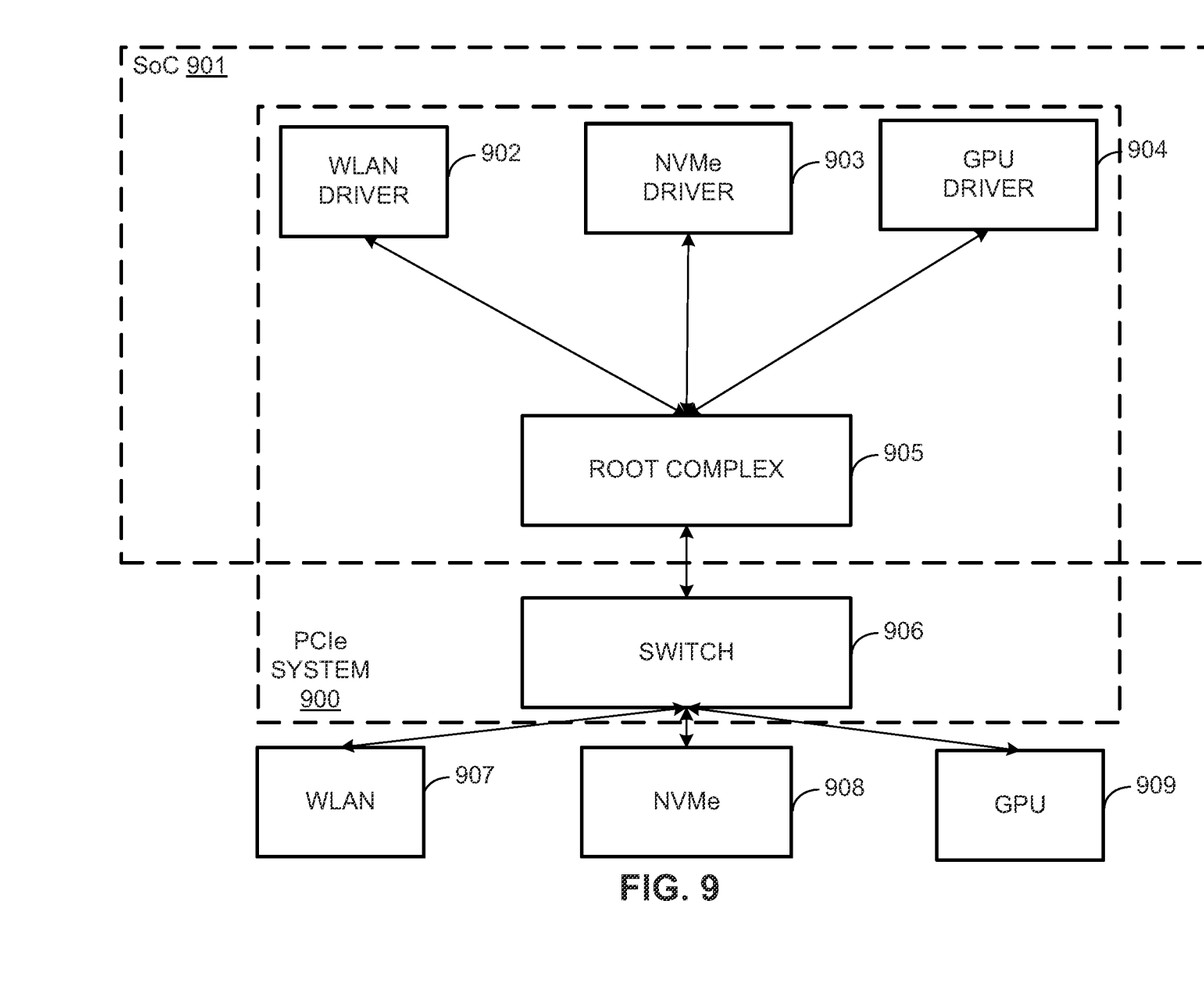
FIG. 9 illustrates a block diagram of the PCIe system in accordance with another exemplary embodiment in which a WLAN driver, an NVMe driver and a GPU driver communicate via an RC and a switch with a WLAN, an NVMe and a GPU, respectively.

FIG. 9 illustrates a block diagram of the PCIe system 900 in accordance with another exemplary embodiment in which drivers 902-904 communicate with end points 907-909, respectively, via an RC 905 and a switch 906. In the exemplary embodiment shown in FIG. 9, the drivers 902-904 and the RC 905 are components of an SoC 901 and include a wireless local area network (WLAN) driver 902, a nonvolatile memory express (NVMe) driver 903 and a GPU driver 904. When any of the drivers 902-904 initiate a PCIe packet transfer, the RC 905, which typically comprises the host processor of the PCIe system 900, performs the processes represented by blocks 701-703 of FIG. 7. When the RC 905 performs these processes, it causes the switch 906 to perform the LS switching process represented by block 704 based on the LS decision outputted at block 703 to cause packet transfers to be made between the WLAN driver 902, the NVMe driver 903 and the GPU driver 904, respectively.

Figure 10:
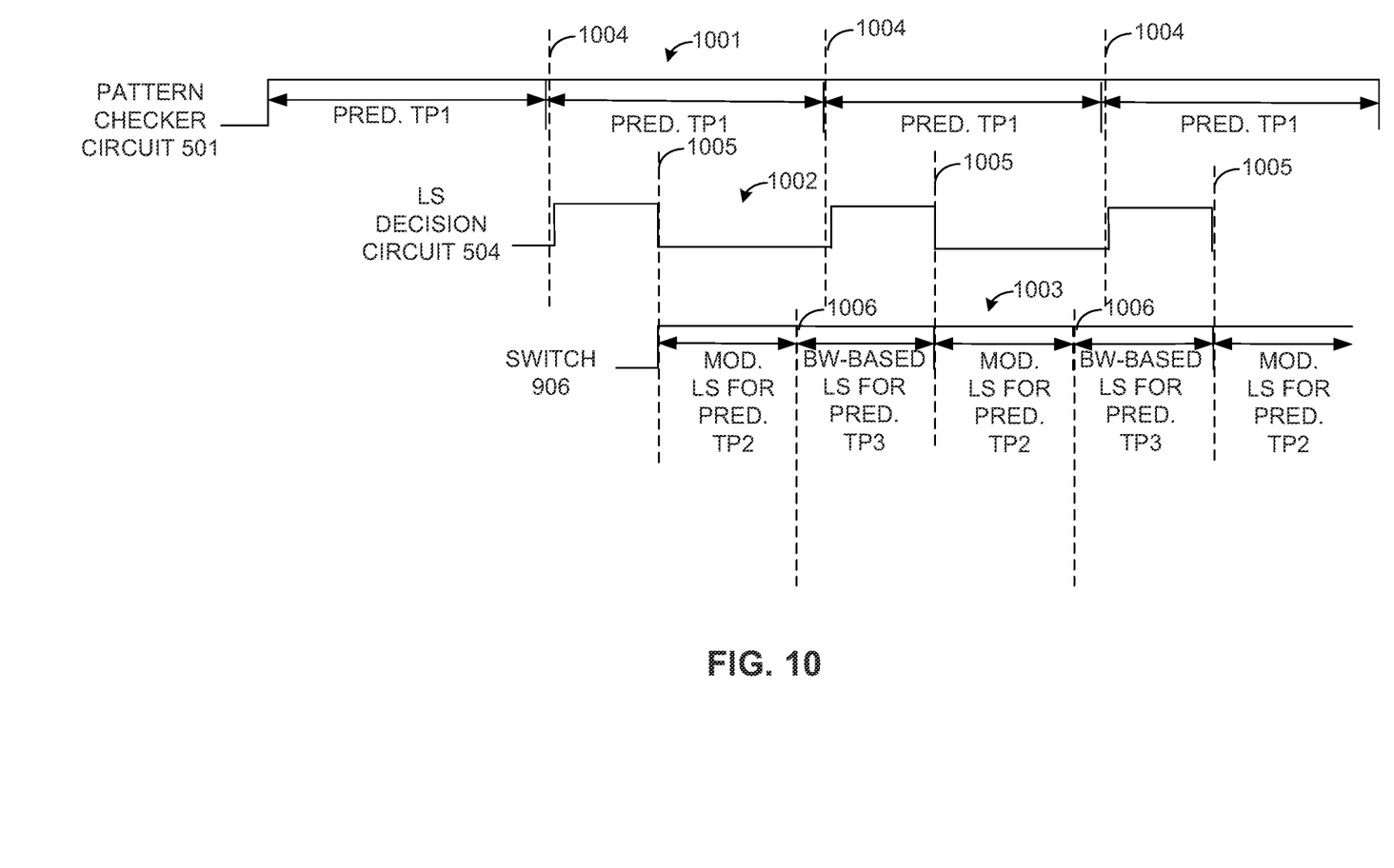
FIG. 10 illustrates a timing diagram that shows the timing of operations performed by the pattern checker circuit shown in FIG. 5, the LS decision circuit shown in FIG. 5 and the switch shown in FIG. 9 when performing the PCIe processes described with reference to FIGS. 5-7.

FIG. 10 illustrates a timing diagram that shows the timing of operations performed by the pattern checker circuit 501 (FIG. 5), the LS decision circuit 504 (FIG. 5) and the switch 906 (FIG. 9) when performing the PCIe processes described above with reference to FIGS. 5-7. The PCIe system 500 shown in FIG. 5 can be implemented in the RC 905 shown in FIG. 9. For discussion purposes, it will be assumed that each time the pattern checker circuit 501 evaluates the incoming and upcoming requests in the DLL and TL layers, respectively, it updates the TH control register 503 with a count that is sufficiently high that the LS decision circuit 504 decides that the modest LS should be used.

Timing patterns 1001, 1002 and 1003 correspond to the timing of operations performed by the pattern checker circuit 501, by the LS decision circuit 504 and by the switch 906, respectively. Timing pattern 1001 shows that during a first predefined time period, abbreviated as Pred. TP1, the pattern checker circuit 501 evaluates the incoming and upcoming requests in the DLL and TL layers, respectively, updates the TH control register 503 with bit values correspond to the count, and determines the modest LS. As indicated above, for demonstrative purposes, it will be assumed that each time the pattern checker circuit 501 performs these operations, the count is sufficiently high that the LS decision circuit 504 decides that the modest LS should be used. At the end of each Pred. TP1, represented by dashed lines 1004, the process starts over and the pattern checker circuit 501 evaluates the next in time sets of incoming and upcoming requests and updates the TH control register 503 accordingly, as indicated by the timing pattern 1001.

After the end of Pred. TP1, the LS decision circuit 504 reads the bits from the TH control register 503, determines based on the value of the bits that the modest LS should be used for a second predefined time period, abbreviated as Pred. TP2, and deasserts the link retraining bit contained in the link control register 505. Once the LS decision circuit 504 has performed those operations, which is at an instant in time represented by dashed lines 1005, the switch 906 uses the modest LS determined by the pattern checker circuit 501 for the Pred. TP2. At the end of Pred. TP2, which is represented by lines 1006, the link speed decision circuit 504 asserts the link retraining bit to allow any BW-based LS. i.e., the LSs associated with the BWs of incoming and upcoming requests, to be used for a third predefined time period, abbreviated as Pred. TP3.

The timing patterns 1001-1003 are not intended to be accurate in terms of the lengths of Pred. TP1-Pred. TP3 relative to one another, but are merely meant to convey the timing of certain operations relative to one another in terms of one set of operations needing to be completed before the next set of operations can be performed. By the end of Pred. TP3, the pattern checker circuit 501 preferably has already performed the operations discussed above for the next batch of incoming and upcoming requests and the LS decision circuit 504 is deciding whether to use the modest LS or the BW-based LS and updating the link control register bit as necessary. There are many variations that can be made with regard to the manner in which the operations described above can be performed and the timing of those operations.

Implementation examples are described in the following numbered clauses:

1. A method for link speed switching in a Peripheral Component Interconnect Express (PCIe) system, the method comprising:
    with a pattern checker circuit of a PCIe host processor of the PCIe system, evaluating information over a first predefined period of time relating to a current batch of client requests to identify a modest link speed;
    with a link speed decision circuit of the PCIe system, deciding whether the client requests are to be served at the modest link speed or at respective link speeds associated with the respective client requests and outputting a link speed decision; and
    in a switch of the PCIe system, performing link speed switching based on the link speed decision.

2. The method of clause 1, wherein the modest link speed corresponds to a bandwidth (BW) associated with a majority of the client requests of the current batch, and wherein the method further comprises:
determining, in the pattern checker circuit, a number of link speed switching operations that will need to be performed to service the client requests and whether the number exceeds one or more predefined threshold (TH) value; and
deciding, in the link speed decision circuit, that link speed switching is to be performed at the modest link speed if the number exceeds said one or more predefined TH values.

3. The method of any of clauses 1 and 2, wherein the current batch of client requests include incoming and upcoming client requests being transported in a data link layer (DLL) and in a transfer layer (TL), respectively, and wherein evaluating said information comprises evaluating information carried in the DLL and in the TL during the first predefined period of time to identify the modest link speed.

4. The method of any of clauses 1-3, wherein if the link speed decision circuit decides that link speed switching is to be performed at the modest link speed, the switch selects the modest link speed during a second predefined period of time.

5. The method of any of clauses 1-4, wherein if the pattern checker circuit determines that the number does not exceed said one or more predefined TH values, the link speed decision circuit decides that the client requests are to be served at the respective link speeds and causes the switch to select the respective link speeds during a third predefined period of time.

6. The method of any of clauses 1-4, further comprising:
with the switch, at an end of the second predefined period of time, switching from the modest link speed to the respective link speeds and selecting the respective link speeds during a third predefined period of time.

7. The method of any of clauses 1-4 and 6, wherein said one or more predefined TH values include at least first and second TH values and wherein the step of comparing the number to said one or more predefined TH values comprises:
in the pattern checker circuit, comparing the number to the first and second predefined TH values to determine whether the number exceeds the first and second predefined TH values, the second predefined TH value being greater than the first predefined TH value.

8. The method of clause 7, wherein the step of performing link speed switching in the switch comprises:
selecting the modest link speed during the second predefined period of time if the number exceeds the second predefined TH value; and
selecting the respective link speeds during a third predefined period of time if the number exceeds the first predefined TH value and is less than the second predefined TH value.

9. The method of any of clauses 2-6, further comprising:
with the pattern checker circuit, after comparing the number to the first and second predefined TH values, updating a threshold control register with one or more bits indicating whether or not the first number exceeds said one or more predefined TH values, and wherein the link speed decision circuit decides whether the client requests are to be served at the modest link speed or at the respective link speeds by reading said one or more bits from the threshold control register and determining a logical value of said one or more bits, the link speed decision being based on the logical value of said one or more bits.

10. The method of any of clauses 1-9, further comprising:
with the link speed decision circuit, if the link speed decision circuit decides that the client requests are to be served at the modest link speed based on the logical value of said one or more bits, deasserting a link retraining bit of a link control register at a beginning of the second predefined period of time and reasserting the link retraining bit after an end of the second predefined period of time.

11. A Peripheral Component Interconnect Express (PCIe) system comprising:
a pattern checker circuit configured to evaluate information over a first predefined period of time relating to a current batch of client requests to identify a modest link speed;
a link speed decision circuit configured to decide whether the client requests are to be served at the modest link speed or at respective link speeds associated with the respective client requests and to output a link speed decision; and
a switch configured to perform link speed switching based on the link speed decision.

12. The PCIe system of clause 11, wherein the modest link speed corresponds to a bandwidth (BW) associated with a majority of the client requests, and wherein the pattern checker circuit is further configured to determine a number of link speed switching operations that will need to be performed to service the client requests and whether the number exceeds one or more predefined threshold (TH) value, and wherein the link speed decision circuit is further configured to decide that link speed switching is to be performed at the modest link speed if the number exceeds said one or more predefined TH values.

13. The PCIe system of any of clauses 11 and 12, wherein the current batch of client requests include incoming and upcoming client requests being transported in a data link layer (DLL) and in a transfer layer (TL), respectively, and wherein the pattern checker circuit is configured to evaluate said information by evaluating information carried in the DLL and in the TL over the first predefined period of time to identify the first link speed and to determine the first number of link speed switching operations that will need to be performed to service the client requests.

14. The PCIe system of any of clauses 11-13, wherein the switch is configured to select the modest link speed during a second predefined period of time if the link speed decision is that link speed switching is to be performed at the modest link speed.

15. The PCIe system of any of clauses 11-14, wherein the link speed decision circuit is configured to decide that the client requests are to be served at the respective link speeds and to cause the switch to select the respective link speeds during a third predefined period of time if the pattern checker circuit determines that the number does not exceed said one or more predefined TH values.

16. The PCIe system of any of clauses 11-14, wherein the link speed decision circuit is further configured to cause the switch to switch from the modest link speed to the respective link speeds and to select the respective link speeds during a third predefined period of time at an end of the second predefined period of time.

17. The PCIe system of any of clauses 11-14 and 16, wherein said one or more predefined TH values include at least first and second TH values and wherein the pattern checker circuit is configured to compare the number to said one or more predefined TH values by comparing the number to the first and second predefined TH values to determine whether the number exceeds the first and second predefined TH values, the second predefined TH value being greater than the first predefined TH value.

18. The PCIe system of clause 17, wherein the link speed decision circuit is configured to cause the switch to select the modest link speed during the second predefined period of time if the number exceeds the second predefined TH value and to cause the switch to select the respective link speeds during a third predefined period of time if the number exceeds the first predefined TH value and is less than the second predefined TH value.

19. The PCIe system of any of clauses 12-16, further comprising:
a threshold control register, the pattern checker circuit being configured to update one or more bits of the threshold control register indicating whether or not the number exceeds the first and second predefined TH values after comparing the number to the first and second predefined TH values, the link speed decision circuit being configured to read said one or more bits and to decide whether the client requests are to be served at the modest link speed or at the respective link speeds based on a logical value of said one or more bits.

20. The PCIe system of any of clauses 11-19, further comprising:
a link control register, the link speed decision circuit being configured to deassert one or more link retraining bits of the link control register at a beginning of the second predefined period of time if the link speed decision circuit decides that the client requests are to be served at the modest link speed and to reassert said one or more link retraining bits after an end of the second predefined period of time.

21. A computer program for execution by a processor of a Peripheral Component Interconnect Express (PCIe) system for performing link speed switching in the PCIe system, the computer program comprising computer instructions embodied on a nontransitory computer-readable medium, the computer program comprising:
a first set of computer instructions for evaluating information over a first predefined period of time relating to a current batch of client requests to identify a modest link speed;
a second set of computer instructions for deciding whether the client requests are to be served at the modest link speed or at respective link speeds associated with the respective client requests and for outputting a link speed decision; and
a third set of computer instructions for causing a switch of the PCIe system to perform link speed switching based on the link speed decision.

22. The computer program of clause 21, wherein the modest link speed corresponds to a bandwidth (BW) associated with a majority of the client requests of the current batch, and wherein the first set of computer instructions further comprises computer instructions for determining a number of link speed switching operations that will need to be performed to service the client requests and whether the number exceeds one or more predefined threshold (TH) value, and wherein the second set of computer instructions further comprises computer instructions for deciding that link speed switching is to be performed at the modest link speed if the number exceeds said one or more predefined TH values.

23. The computer program of any of clauses 21 and 22, wherein the current batch of client requests include incoming and upcoming client requests being transported in a data link layer (DLL) and in a transfer layer (TL), respectively, and wherein the first set of computer instructions evaluates said information by evaluating information carried in the DLL and in the TL during the first predefined period of time to identify the modest link speed.

24. The computer program of any of clauses 21-23, wherein if the second set of computer instructions decides that link speed switching is to be performed at the modest link speed, the third set of computer instructions causes the switch to select the modest link speed during a second predefined period of time.

25. The computer program of any of clauses 21-24, wherein if the first set of computer instructions determines that the number does not exceed said one or more predefined TH values, the second set of computer instructions decides that the client requests are to be served at the respective link speeds and the third set of computer instructions causes the switch to select the respective link speeds during a third predefined period of time.

26. The computer program of clauses 21-24, wherein the third set of computer instructions further comprises:
computer instructions for causing the switch, at an end of the second predefined period of time, to switch from the modest link speed to the respective link speeds and select the respective link speeds during a third predefined period of time.

27. The computer program of any of clauses 21-24 and 26, wherein said one or more predefined TH values include at least first and second TH values and wherein the first set of computer instructions compares the number to said one or more predefined TH values by comparing the number to the first and second predefined TH values to determine whether the number exceeds the first and second predefined TH values, the second predefined TH value being greater than the first predefined TH value.

28. The computer program of clause 27, wherein the third set of computer instructions comprises computer instructions for causing the switch to select the modest link speed during the second predefined period of time if the number exceeds the second predefined TH value, and for causing the switch to select the respective link speeds during a third predefined period of time if the number exceeds the first predefined TH value and is less than the second predefined TH value.

29. The computer program of any of clauses 22-26, wherein the first set of computer instructions further comprises computer instructions for updating a threshold control register with one or more bits indicating whether or not the number exceeds said one or more predefined TH values, and wherein the second set of computer instructions decides whether the client requests are to be served at the modest link speed or at the respective link speeds by reading said one or more bits from the threshold control register and determining a logical value of said one or more bits, the link speed decision being based on the logical value of said one or more bits, and wherein the second set of computer instructions further comprises computer instructions for deasserting a link retraining bit of a link control register at a beginning of the second predefined period of time if the link speed decision circuit decides that the client requests are to be served at the modest link speed based on the logical value of said one or more bits and for reasserting the link retraining bit after an end of the second predefined period of time.

30. A Peripheral Component Interconnect Express (PCIe) system comprising:
means for evaluating information over a first predefined period of time relating to a current batch of client requests to identify a modest link speed;
means for deciding whether the client requests are to be served at the modest link speed or at respective link speeds associated with the respective client requests and for outputting a link speed decision; and
means for causing a switch of the PCIe system to perform link speed switching based on the link speed decision.

Alternative embodiments will become apparent to one of ordinary skill in the art to which the invention pertains in view of the present disclosure. Therefore, although selected aspects have been illustrated and described in detail, it will be understood that various substitutions and alterations may be made therein.

What is claimed is:

1. A method for link speed switching in a Peripheral Component Interconnect Express (PCIe) system, the method comprising:
with a pattern checker circuit of a PCIe host processor of the PCIe system, evaluating information over a first predefined period of time relating to a current batch of client requests to identify a modest link speed, wherein the modest link speed corresponds to a bandwidth (BW) associated with a majority of the client requests of the current batch;
determining, in the pattern checker circuit, a number of link speed switching operations that will need to be performed to service the client requests and whether the number exceeds one or more predefined threshold (TH) values;
with a link speed decision circuit of the PCIe system, deciding whether the client requests are to be served at the modest link speed or at respective link speeds associated with the respective client requests and outputting a link speed decision;
deciding, in the link speed decision circuit, that link speed switching is to be performed at the modest link speed if the number exceeds said one or more predefined TH values; and
in a switch of the PCIe system, performing link speed switching based on the link speed decision.

2. The method of claim 1, wherein the current batch of client requests include incoming and upcoming client requests being transported in a data link layer (DLL) and in a transfer layer (TL), respectively, and wherein evaluating said information comprises evaluating information carried in the DLL and in the TL during the first predefined period of time to identify the modest link speed.

3. The method of claim 1, wherein if the link speed decision circuit decides that link speed switching is to be performed at the modest link speed, the switch selects the modest link speed during a second predefined period of time.

4. The method of claim 3, wherein if the pattern checker circuit determines that the number does not exceed said one or more predefined TH values, the link speed decision circuit decides that the client requests are to be served at the respective link speeds and causes the switch to select the respective link speeds during a third predefined period of time.

5. The method of claim 3, further comprising:
with the switch, at an end of the second predefined period of time, switching from the modest link speed to the respective link speeds and selecting the respective link speeds during a third predefined period of time.

6. The method of claim 3, wherein said one or more predefined TH values include at least first and second TH values and wherein the step of comparing the number to said one or more predefined TH values comprises:
in the pattern checker circuit, comparing the number to the first and second predefined TH values to determine whether the number exceeds the first and second predefined TH values, the second predefined TH value being greater than the first predefined TH value.

7. The method of claim 6, wherein the step of performing link speed switching in the switch comprises:
selecting the modest link speed during the second predefined period of time if the number exceeds the second predefined TH value; and
selecting the respective link speeds during a third predefined period of time if the number exceeds the first predefined TH value and is less than the second predefined TH value.

8. The method of claim 2, further comprising:
with the pattern checker circuit, after comparing the number to said one or more predefined TH values, updating a threshold control register with one or more bits indicating whether or not the first number exceeds the first and second predefined TH values, and wherein the link speed decision circuit decides whether the client requests are to be served at the modest link speed or at the respective link speeds by reading said one or more bits from the threshold control register and determining a logical value of said one or more bits, the link speed decision being based on the logical value of said one or more bits.

9. The method of claim 8, further comprising:
with the link speed decision circuit, if the link speed decision circuit decides that the client requests are to be served at the modest link speed based on the logical value of said one or more bits, deasserting a link retraining bit of a link control register at a beginning of the second predefined period of time and reasserting the link retraining bit after an end of the second predefined period of time.

10. A Peripheral Component Interconnect Express (PCIe) system comprising:
a pattern checker circuit configured to evaluate information over a first predefined period of time relating to a current batch of client requests to identify a modest link speed, wherein the modest link speed corresponds to a bandwidth (BW) associated with a majority of the client requests, the pattern checker circuit is further configured to determine a number of link speed switching operations that will need to be performed to service the client requests and whether the number exceeds one or more predefined threshold (TH) values;
a link speed decision circuit configured to decide whether the client requests are to be served at the modest link speed or at respective link speeds associated with the respective client requests and to output a link speed decision, the link speed decision circuit is further configured to decide that link speed switching is to be performed at the modest link speed if the number exceeds said one or more predefined TH values; and a switch configured to perform link speed switching based on the link speed decision.

11. The PCIe system of claim 10, wherein the current batch of client requests include incoming and upcoming client requests being transported in a data link layer (DLL) and in a transfer layer (TL), respectively, and wherein the pattern checker circuit is configured to evaluate said information by evaluating information carried in the DLL and in the TL over the first predefined period of time to identify the first link speed and to determine the first number of link speed switching operations that will need to be performed to service the client requests.

12. The PCIe system of claim 10, wherein the switch is configured to select the modest link speed during a second predefined period of time if the link speed decision is that link speed switching is to be performed at the modest link speed.

13. The PCIe system of claim 12, wherein the link speed decision circuit is configured to decide that the client requests are to be served at the respective link speeds and to cause the switch to select the respective link speeds during a third predefined period of time if the pattern checker circuit determines that the number does not exceed said one or more predefined TH values.

14. The PCIe system of claim 12, wherein the link speed decision circuit is further configured to cause the switch to switch from the modest link speed to the respective link speeds and to select the respective link speeds during a third predefined period of time at an end of the second predefined period of time.

15. The PCIe system of claim 12, wherein said one or more predefined TH values include at least first and second TH values and wherein the pattern checker circuit is configured to compare the number to said one or more predefined TH values by comparing the number to the first and second predefined TH values to determine whether the number exceeds the first and second predefined TH values, the second predefined TH value being greater than the first predefined TH value.

16. The PCIe system of claim 15, wherein the link speed decision circuit is configured to cause the switch to select the modest link speed during the second predefined period of time if the number exceeds the second predefined TH value and to cause the switch to select the respective link speeds during a third predefined period of time if the number exceeds the first predefined TH value and is less than the second predefined TH value.

17. The PCIe system of claim 10, further comprising:
a threshold control register, the pattern checker circuit being configured to update one or more bits of the threshold control register indicating whether or not the number exceeds said one or more predefined TH values after comparing the number to said one or more predefined TH values, the link speed decision circuit being configured to read said one or more bits and to decide whether the client requests are to be served at the modest link speed or at the respective link speeds based on a logical value of said one or more bits.

18. The PCIe system of claim 17, further comprising:
a link control register, the link speed decision circuit being configured to deassert one or more link retraining bits of the link control register at a beginning of the second predefined period of time if the link speed decision circuit decides that the client requests are to be served at the modest link speed and to reassert said one or more link retraining bits after an end of the second predefined period of time.

19. A nontransitory computer program product for execution by a processor of a Peripheral Component Interconnect Express (PCIe) system for performing link speed switching in the PCIe system, the computer program product comprising computer instructions embodied on a nontransitory computer-readable medium, the computer program product further comprising:
a first set of computer instructions for evaluating information over a first predefined period of time relating to a current batch of client requests to identify a modest link speed, wherein the modest link speed corresponds to a bandwidth (BW) associated with a majority of the client requests of the current batch;
the first set of computer instructions further comprises computer instructions for determining a number of link speed switching operations that will need to be performed to service the client requests and whether the number exceeds one or more predefined threshold (TH) value;
a second set of computer instructions for deciding whether the client requests are to be served at the modest link speed or at respective link speeds associated with the respective client requests and for outputting a link speed decision;
the second set of computer instructions further comprises computer instructions for deciding that link speed switching is to be performed at the modest link speed if the number exceeds said one or more predefined TH values; and
a third set of computer instructions for causing a switch of the PCIe system to perform link speed switching based on the link speed decision.

20. The computer program product of claim 19, wherein the current batch of client requests include incoming and upcoming client requests being transported in a data link layer (DLL) and in a transfer layer (TL), respectively, and wherein the first set of computer instructions evaluates said information by evaluating information carried in the DLL and in the TL during the first predefined period of time to identify the modest link speed.

21. The computer program product of claim 19, wherein if the second set of computer instructions decides that link speed switching is to be performed at the modest link speed, the third set of computer instructions causes the switch to select the modest link speed during a second predefined period of time.

22. The computer program product of claim 21, wherein if the first set of computer instructions determines that the number does not exceed said one or more predefined TH values, the second set of computer instructions decides that the client requests are to be served at the respective link speeds and the third set of computer instructions causes the switch to select the respective link speeds during a third predefined period of time.

23. The computer program product of claim 21, wherein the third set of computer instructions further comprises:
computer instructions for causing the switch, at an end of the second predefined period of time, to switch from the modest link speed to the respective link speeds and select the respective link speeds during a third predefined period of time.

24. The computer program product of claim 21, wherein said one or more predefined TH values include at least first and second TH values and wherein the first set of computer instructions compares the number to said one or more predefined TH values by comparing the number to the first and second predefined TH values to determine whether the number exceeds the first and second predefined TH values, the second predefined TH value being greater than the first predefined TH value.

25. The computer program product of claim 24, wherein the third set of computer instructions comprises computer instructions for causing the switch to select the modest link speed during the second predefined period of time if the number exceeds the second predefined TH value, and for causing the switch to select the respective link speeds during a third predefined period of time if the number exceeds the first predefined TH value and is less than the second predefined TH value.

26. The computer program product of claim 19, wherein the first set of computer instructions further comprises computer instructions for updating a threshold control register with one or more bits indicating whether or not the number exceeds said one or more predefined TH values, and wherein the second set of computer instructions decides whether the client requests are to be served at the modest link speed or at the respective link speeds by reading said one or more bits from the threshold control register and determining a logical value of said one or more bits, the link speed decision being based on the logical value of said one or more bits, and wherein the second set of computer instructions further comprises computer instructions for deasserting a link retraining bit of a link control register at a beginning of the second predefined period of time if the link speed decision circuit decides that the client requests are to be served at the modest link speed and for reasserting the link retraining bit after an end of the second predefined period of time.

27. A Peripheral Component Interconnect Express (PCIe) system comprising:
- means for evaluating information over a first predefined period of time relating to a current batch of client requests to identify a modest link speed, wherein the modest link speed corresponds to a bandwidth (BW) associated with a majority of the client requests of the current batch;
- the means for evaluating further comprising means for determining a number of link speed switching operations that will need to be performed to service the client requests and whether the number exceeds one or more predefined threshold (TH) values;
- means for deciding whether the client requests are to be served at the modest link speed or at respective link speeds associated with the respective client requests and for outputting a link speed decision;
- the means for deciding further comprising means for determining that link speed switching is to be performed at the modest link speed if the number exceeds said one or more predefined TH values; and
- means for causing a switch of the PCIe system to perform link speed switching based on the link speed decision.

* * * * *